United States Patent
Starkweather

[11] 3,970,359
[45] July 20, 1976

[54] FLYING SPOT FLAT FIELD SCANNER

[75] Inventor: Gary K. Starkweather, Saratoga, Calif.

[73] Assignee: Xerox Corporation, Stamford, Conn.

[22] Filed: Feb. 3, 1975

[21] Appl. No.: 546,477

[52] U.S. Cl. .................................. 350/7; 355/8; 355/66; 250/236; 178/7.6
[51] Int. Cl.² ............. G02B 27/17; G03G 15/28; G03B 27/70; H04N 3/00
[58] Field of Search .......... 350/6, 7, 285, 172; 178/7.6, 6.7; 355/8, 66, 11, 65, 57, 60; 250/236, 235; 356/167, 203

[56] References Cited
UNITED STATES PATENTS

| | | | |
|---|---|---|---|
| 3,360,659 | 12/1967 | Young | 356/167 |
| 3,456,997 | 7/1969 | Stites et al. | 350/7 |
| 3,495,036 | 2/1970 | Clayton | 178/7.6 |
| 3,689,145 | 9/1972 | Kawakubo et al. | 355/8 |
| 3,720,466 | 3/1973 | Koizumi | 355/8 |
| 3,806,222 | 4/1974 | Knappe | 350/7 |
| 3,832,057 | 8/1974 | Shogren | 355/8 |

*Primary Examiner*—John K. Corbin
*Assistant Examiner*—Jon W. Henry

[57] ABSTRACT

A flying spot flat field scanning system is provided wherein a laser beam is directed to a polygon scanner which sweeps the beam via a pair of relatively movable mirrors across a document to provide a scan in an $x$ direction. The mirrors move relative to one another across the document to provide a scan in a $y$ direction and move at such a relative rate to maintain optical conjugates constant.

1 Claim, 2 Drawing Figures

FLYING SPOT FLAT FIELD SCANNER

DESCRIPTION OF INVENTION

A flying aperture flat field scanning system is disclosed in U.S. Pat. No. 3,752,558. However, a flood type illumination is relied upon which does not illuminate a document at an intensity to detect as many variations in image density that a flying spot scanning system can detect. Furthermore, an oscillatory type scanner is utilized which results in rather slow scanning speeds.

It is, therefore, an object of this invention to provide a flat field scanning system which is capable of detecting reasonable variations in image density at high speeds.

It is a further object of this invention to provide a flying spot scanning system which is capable of scanning the spot across a stationary document.

It is proposed to effect the above object by directing a beam to a scanner which sweeps the beam via a pair of relatively movable mirrors across a document to provide a scan in an $x$ direction. The mirrors move relative to one another across the document to provide a scan in a $y$ direction and move at such a relative rate to maintain optical conjugates constant.

Other objects of the invention will become apparent from the following description with reference to the drawings wherein.

Figure 1:
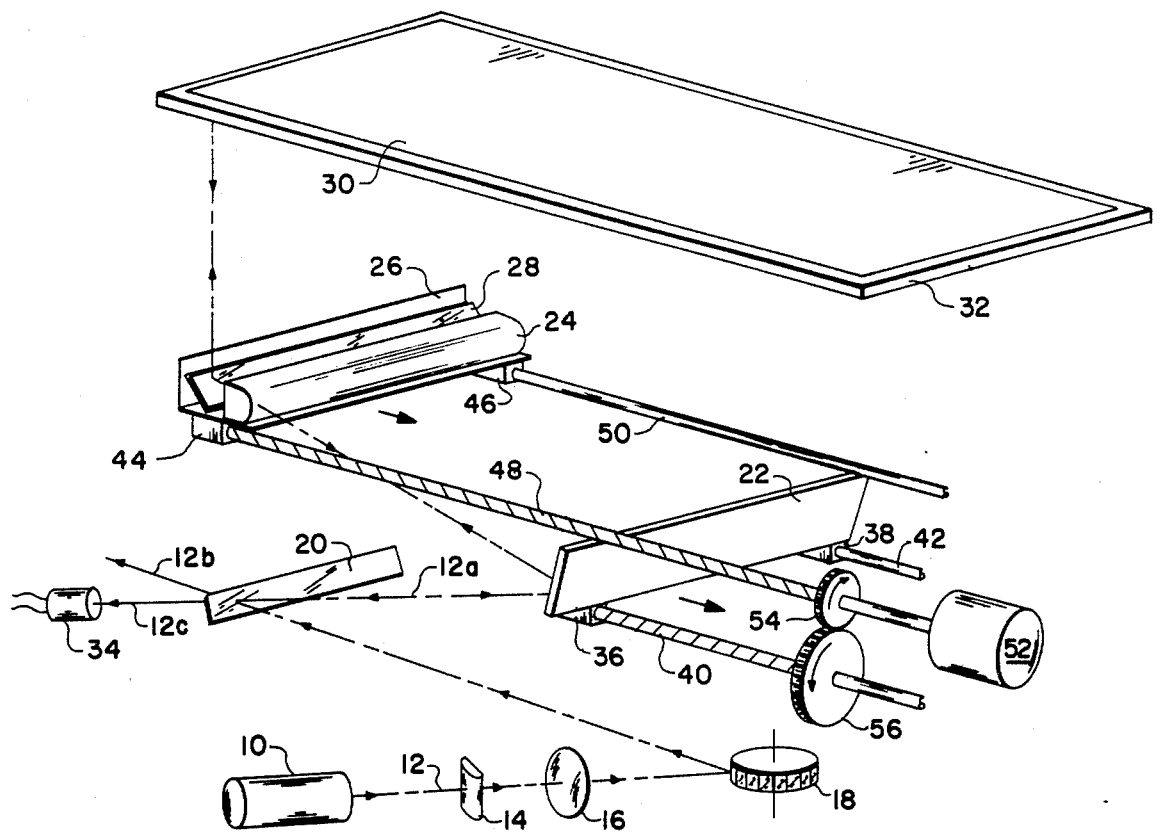
FIG. 1 is an isometric view of a flying spot scanning system.
Figure 2:
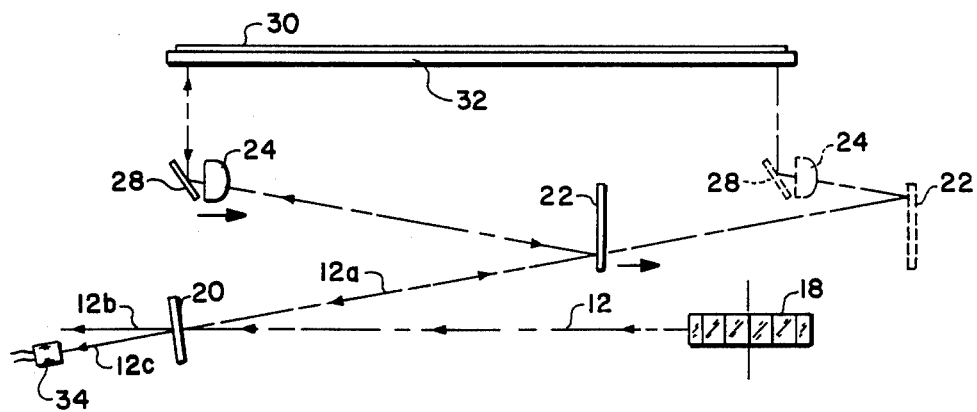
FIG. 2 is a side view of the system shown in FIG. 1.

Referring to FIGS. 1 and 2, an embodiment of the scanning system in accordance with the invention is shown. A light source 10 provides an original light beam 12 for utilization by the scanning system. The light source 10 is preferably a laser which generates a collimated beam of monochromatic light. A cylindrical lens 14 and a spherical imaging lens 16 are fixedly positioned in the optical path between the laser and a rotating polygon scanner 18 which has a plurality of reflecting facets thereon. The cylindrical lens has its power plane in the tangential plane which is substantially perpendicular to the axis of rotation of the polygon 18 and acts to expand the beam 12 in the power plane. The spherical lens 16 causes the beam to converge in both planes and focus in the sagittal plane at the polygon facets. The beam width (in direction of scan) at the polygon will be about the width of two facets. The beam is then reflected from the polygon to a stationary beam splitter 20 which is at such an angle to reflect a portion 12a of the beam upwards to a mirror 22 which redirects the beam to a cylinder lens 24 which is mounted on a carrier 26 in front of a mirror 28 which is also mounted on the carrier 26. The other portion 12b of the beam 12 passes through the beam splitter and can be used for synchronization functions or dissipated into space. The beam 12a passes to and is reflected off of the mirror 28 onto a stationary document 30 on a flat platen 32 and is reflected from the document back to the beam splitter 20 via the mirrors 28 and 22. A portion 12c of the reflected beam passes through the beam splitter 20 to a photomultiplier 34 which converts the variation in intensity of the beam 12c into electrical information signals which are transmitted to a buffer for storage or to a recording device for producing a copy of the document scanned.

The cylinder lens 24 has its power plane in the sagittal plane (parallel to the axis of the polygon). The cylinder lens 14 in conjunction with the imaging lens 16 acts to focus the beam 12a in the tangential plane within a depth of focus which lies on the top surface of the platen on which the document 30 rests. The imaging lens 16 and the cylinder lens 24 act in conjunction to focus the beam 12a in the sagittal plane within a depth of focus which also lies on the top surface of the platen on which the document 30 rests.

The mirrors 22 and 28 and the cylinder lens 24 are of a length which is substantially equal to the width of the platen. The mirror 22 is fixed to a pair of blocks 36 and 38 through which a worm shaft 40 and a fixed guide rod 42 extend, respectively. The carrier 26 has a pair of blocks 44 and 46 fixed thereto. The blocks 44 and 46 receive a worm shaft 48 and a fixed guide rod 50 therethrough, respectively. The worm shaft 48 is driven by a reversible motor 52 and is interconnected to the worm shaft 40 by intermeshing gears 54 and 56. The gear 54 is fixed to the shaft 48 and is smaller than the gear 56 which is fixed to the shaft 40. Rotation of the worm shafts 40 and 48 will cause movement of the mirrors 22 and 28 lengthwise of the platen with carrier 26 moving in a direction toward mirror 22 and mirror 22 moving in the same direction for a total distance of one-half the total distance carrier 26 moves, which movement is illustrated in phantom in FIG. 2. The gear ratio is such that the shaft 48 will rotate faster than the shaft 40 to the extent that the carrier 26 will move in a direction towards the mirror 22 at a rate which is twice as fast as the mirror 22 is moved in the same direction. This relative rate of movement between the mirrors will keep the beam distance constant between the laser 10 and the platen 32 which will maintain the optical conjugates constant thereby permitting the lenses 14 and 16 to be stationary. To eliminate a warm-up time before a scanning operation, a shutter mechanism (not shown) may be placed adjacent the laser 10 in the path of the beam 12 to prevent the same from reaching the rest of the system when the system is not in operation.

In operation, the document 30 is placed on the platen 32 and the shutter mechanism (not shown) is actuated to allow beam 12 to pass to the rest of the system. At the same time, motor 52 is energized to actuate the worm shafts 40 and 48 to move the carrier 26 and mirror 22. The beam 12 from the laser is scanned across the length of beam splitter 20 and the mirrors 22 and 28 and thereby across the width of the document 30 to effect a scan in the $x$ direction as the mirror 28 traverses the length of the document 30 to effect a scan of successive increments thereof in the $y$ direction. The mirror 22 moves at one-half the rate of the carrier 26 to maintain the optical conjugates constant. The diffuse reflections from the document are directed by mirrors 28 and 22 to and through the beam splitter 20 to the photomultiplier 34 where the differences in intensity, representing background and image areas, are converted to electrical information signals which may be either stored or transmitted to a printer.

Since the indicia is illuminated by an intense spot of light, reasonable variations in image density may be detected by the photomultiplier 34 and since a polygon scanner is utilized, these variations may be detected a thigh speeds.

What is claimed is:

1. A flying spot scanning system comprising: a laser generating a beam of collimated light; a generally planar document station; a first mirror; a second mirror; a beam splitter; optical means for imaging said beam to said document station; a rotatable polygon scanner located between said laser and said beam splitter and in the path of said beam for scanning said beam onto said beam splitter said beam splitter reflecting said beam to said first mirror; said first mirror reflecting said beam to said second mirror; said second mirror reflecting said beam to said document station; means for detecting reflections of said beam from said document station; said second mirror directing said beam to said document station at an angle to receive reflection of said beam from said document and direct the same to said first mirror which directs the same to said beam splitter whereby a portion thereof passes therethrough; said detecting means being positioned to detect the beam reflections passing through said beam splitter; said optical means including a cylinder lens, the power plane of which is substantially parallel to the axis of polygon rotation; said cylinder lens being located between said first and second mirrors, each of said mirrors and said cylinder lens extending across said document station in the direction of beam scan whereby the beam will be scanned across said document station in an $x$ direction; means mounting said first and second mirrors and said cylinder lens for movement in $y$ direction transverse to said $x$ direction; means for moving said second mirror and said cylinder lens as a unit in said $y$ direction across substantially the full length of said document station and for simultaneously moving said first mirror in the same direction as said second mirror and cylinder lens are moved a distance substantially less than the distance said second mirror and said cylinder lens are moved; the relative distance of and the relative rate of movement of said mirrors and cylinder lens being such to maintain the length of said beam between said laser and said document station and the optical conjugates substantially constant.

* * * * *